Oct. 27, 1925.
J. CHESLER
WATER METER
Filed Jan. 19, 1923
1,558,532
2 Sheets-Sheet 1
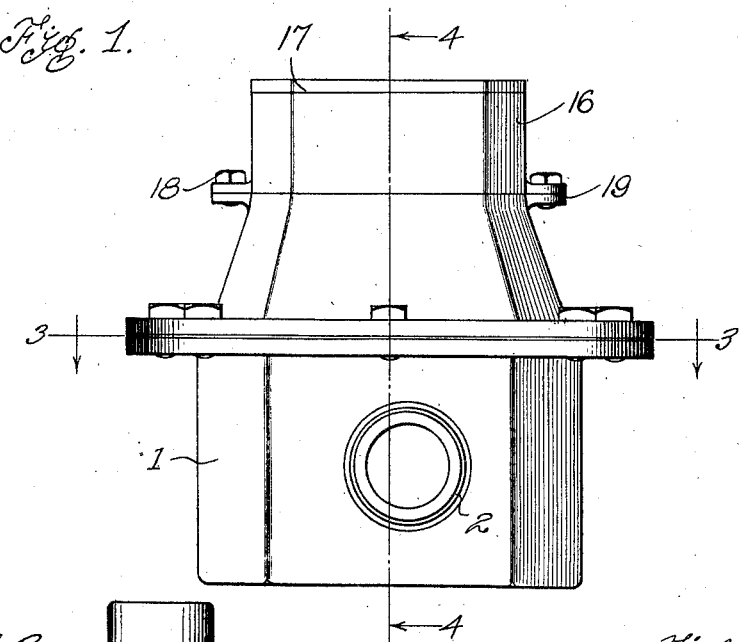
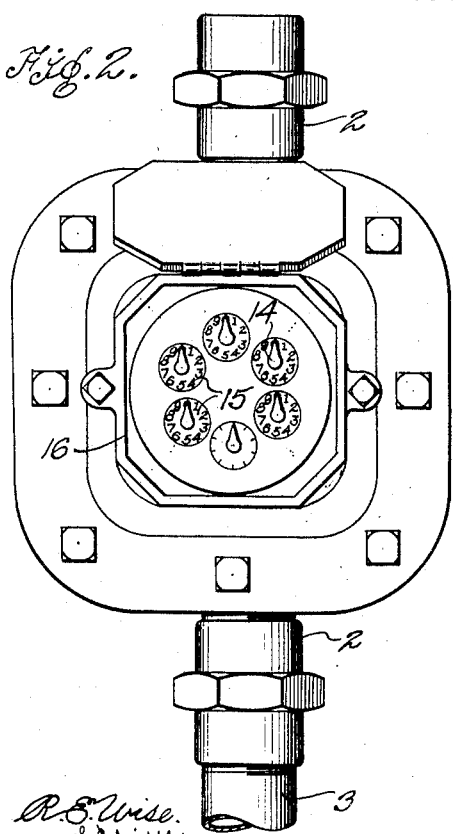
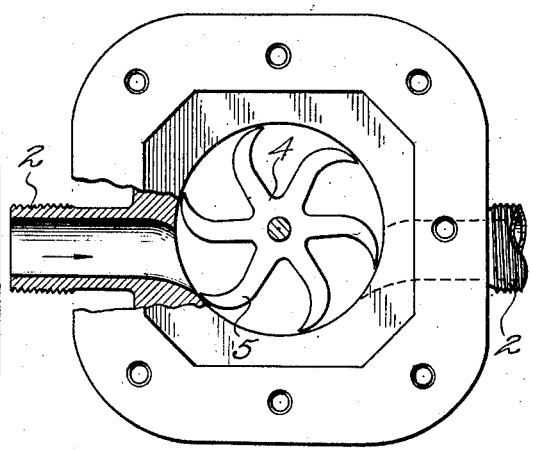
Joseph Chesler
INVENTOR
BY Victor J. Evans
ATTORNEY Oct. 27, 1925.

J. CHESLER

WATER METER

Filed Jan. 19, 1923  2 Sheets-Sheet 2

1,558,532

Joseph Chesler
INVENTOR

BY Victor J. Evans
ATTORNEY

WITNESS:

Patented Oct. 27, 1925.

1,558,532

UNITED STATES PATENT OFFICE.

JOSEPH CHESLER, OF SIDNEY, OHIO, ASSIGNOR TO CHESLER METER COMPANY, OF SIDNEY, OHIO.

WATER METER.

Application filed January 19, 1923. Serial No. 613,741.

*To all whom it may concern:*

Be it known that I, JOSEPH CHESLER, a citizen of the United States, residing at Sidney, in the county of Shelby and State of Ohio, have invented new and useful Improvements in Water Meters, of which the following is a specification.

This invention relates to a water meter, the general object of the invention being to provide a wheel which is actuated by the water passing through the device and which is connected to a series of shaft carrying pointers which operate over dials for indicating the amount of water passing through the device.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like numerals denote like or corresponding parts throughout the several views, and in which:—

Figure 1 is an elevation of the device.

Figure 2 is a plan view with the cover swung back.

Figure 3 is a section on line 3—3 of Figure 1.

Figure 4:
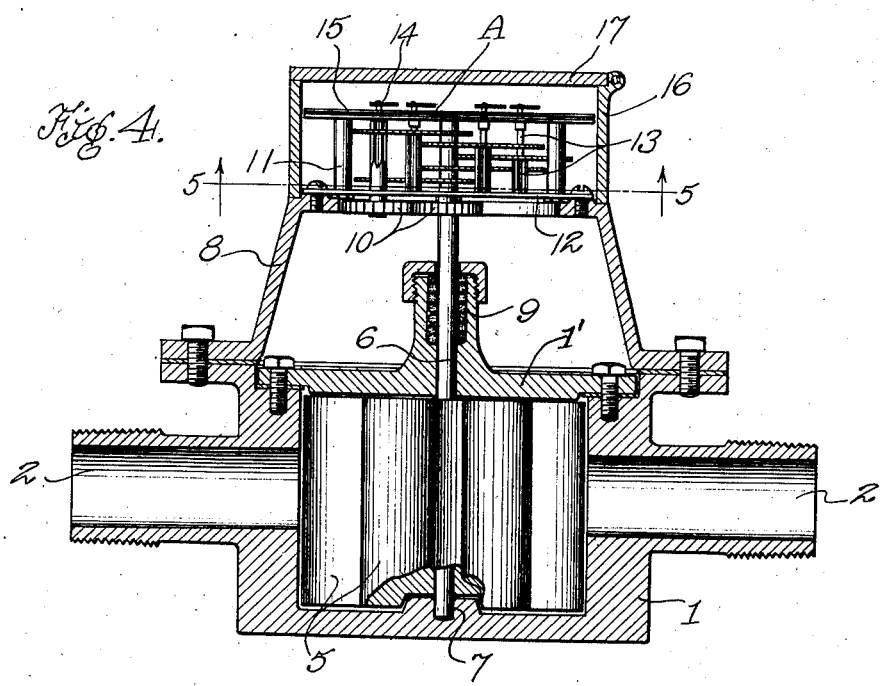
Figure 4 is a section on line 4—4 of Figure 1.
Figure 5:
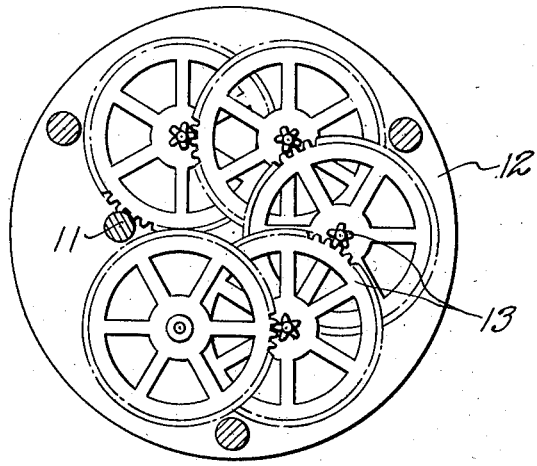
Figure 5 is a section on line 5—5 of Figure 4.

In these views 1 indicates a casing which is provided with the oppositely arranged couplings 2 for permitting it to be placed in a water line, portions of which are shown at 3. The casing has its top countersunk to receive a top plate 1' which is bolted to the casing, a gasket being used to make a watertight joint. A wheel 4 is placed in said casing, the blades 5 of which are so formed that the water passing through the casing engaging said blades will cause the wheel to rotate. The shaft 6 of said wheel is provided with a bearing 7 in the bottom of the casing and said shaft passes through the top plate of the casing into a second casing 8 which is bolted to the first casing the two casings having flanges through which the bolts pass and the upper casing can be removed without disturbing the top plate 1'. A gland 9 is arranged on the top plate 1' and the upper end of the shaft is connected by the gears 10 with a shaft 11 which passes through the top of the second casing and through the plates 12 of the register mechanism A which is carried by the upper casing. This mechanism includes the shafting and gearing shown generally at 13, the pointers 14 connected with the shafting and the dials 15 associated with the pointers and carried by the top plate. Thus the amount of water passing through the lower casing will be indicated by the pointers and dials. The register A is enclosed by a boxing 16 which is provided with the hinged top 17 and which is connected with the upper casing by the bolts 18 passing through the brackets 19 which are secured to the top casing and boxing. Thus the register can be read by simply opening the top 17 and when the device is to be reset or repaired it is simply necessary to remove the bolts 18 to take off the boxing and thus gain access to the register.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A water meter comprising upper and lower casings having abutting flanges which are bolted together, the lower casing being provided with inlet and outlet nipples and having a countersink in its top, a top plate bolted in the countersink for closing the lower casing from the upper casing and permitting the upper casing to be removed without shutting off the flow of water through the lower casing, a gland on said plate, a shaft passing through the gland and having its lower end journaled in the bottom of the lower casing, a water wheel in the lower casing and attached to the shaft, a register mechanism including a shaft and supporting plates, the bottom one of which is fastened to the top of the upper casing, gears connecting the shaft of this mechanism with the first mentioned shaft, a boxing for enclosing the register mechanism and bolted to the upper casing and a hinged top for the boxing.

In testimony whereof I affix my signature.

JOSEPH CHESLER.